UNITED STATES PATENT OFFICE.

JAMES B. GARNER, OF PITTSBURGH, PENNSYLVANIA, ASSIGNOR TO METALS RESEARCH COMPANY, OF NEW YORK, N. Y., A CORPORATION OF MAINE.

RECOVERY OF SULFUR DIOXID.

1,145,579.  Specification of Letters Patent.  Patented July 6, 1915.

No Drawing.  Application filed December 3, 1914. Serial No. 875,241.

*To all whom it may concern:*

Be it known that I, JAMES B. GARNER, a citizen of the United States, residing in the city of Pittsburgh, Allegheny county, State of Pennsylvania, have invented certain new and useful Improvements in Recovery of Sulfur Dioxid; and I do hereby declare the following to be a full, clear, and exact description of the invention, such as will enable others skilled in the art to which it appertains to make and use the same.

The present invention relates to the concentration and absorption of sulfur dioxid from gases in which it is contained, as, for instance, the gases given off from roasting and smelting furnaces, or derivable from any other source, gaseous, liquid, semi-liquid, or solid.

The invention is based upon the discovery that animal or vegetable charcoal or coke, prepared in the manner hereinafter described is particularly available for the purpose of concentrating, absorbing, adsorbing, or otherwise taking up and retaining gaseous sulfur dioxid, and that the sulfur dioxid thus taken up may be subsequently expelled therefrom as such and recovered in its substantial entirety and in a condition of great purity. After the expulsion and recovery of the sulfur dioxid, the charcoal or coke is found to be again available for the recovery and absorption of further quantities of sulfur dioxid, without substantial diminution of its original efficacy.

In carrying out the invention, I may employ either coke, as hereinbefore indicated, animal charcoal (such as bone black), or vegetable charcoal. I have found that box wood charcoal has apparently the highest degree of absorptive capacity, under the conditions of use, it being capable of taking up as high as 30% by weight of sulfur dioxid. Other vegetable charcoals, however, are available for the purpose, their selective capacities for the absorption of sulfur dioxid from gaseous mixtures differing somewhat in accordance with the various woods from which they are derived. This is true, not only of the usual wood charcoals of commerce, but also of charcoals from all other woods that are available for charcoal manufacture, and, in all cases, the selective capacity of the charcoal is decided and considerable,—the amount of sulfur dioxid absorbable in no case falls below 10% by weight of the charcoal employed. It will be understood, therefore, that the invention, in so far as charcoal is concerned, is not limited to any particular kind of charcoal, the kind selected depending upon local considerations as to availability, cost and the like.

In preparing the material for use, I first subject it to heat, under such conditions as to drive off, as far as possible, any occluded gases or volatile ingredients normally present of a character which, if left in the charcoal would tend to deposit elemental sulfur within the mass upon the removal of the sulfur dioxid therefrom and would materially decrease the absorptive power of the charcoal when used in a subsequent cycle. Thus in the case of ordinary charcoal, it may be prepared for use by either of the two following methods:

First: In the case of ordinary charcoal, obtained say from pine wood, or spruce wood, the charcoal is heated in a closed oven in an inert atmosphere; that is to say, for a period of time which I prefer shall be about five hours, and at a temperature ranging from 250° C. to 275° C. An atmosphere sufficiently inert is obtained if the oven is well filled with charcoal and is tightly closed. It is then permitted to cool to atmospheric temperatures, before removal from the oven, whereafter it is heated in a closed receptacle, under a pressure lower than atmospheric pressure—preferably a pressure of 7 to 17 millimeters of the mercury column for, say, one-half hour, at a temperature of from 100° C. to 125° C, whereupon it is permitted to cool for one-half hour under this pressure, down to atmospheric temperatures, or lower, and is then ready for use.

Second: The charcoal may be simply heated in a closed receptacle under diminished pressure, preferably of 7 to 17 mm. of the mercury column for, say, one-half hour at a temperature of 100° C. to 125° C, whereafter it is permitted to cool for one-half hour under this pressure to the atmospheric temperature or lower and is then ready for use.

It is obvious that in the preparation of charcoal from wood by observing during the finishing operations the general conditions above indicated, a charcoal may be prepared which will have the desired properties and will need no subsequent treatment, to make it available for sulfur dioxide absorption. In this connection, I may say that, in the preparation of any particular charcoal, I have found that the lower the pressure under which it is heated, for the purposes of the present invention, the more efficient is the charcoal obtained, under like conditions of temperature, and duration of heating. I have also observed that, with different charcoals, the time required for driving off the prejudicial occluded gases and volatile ingredients varies somewhat, and it will be understood, therefore, that I do not limit myself to the exact temperatures or pressures stated, inasmuch as they may be varied within a considerable range, in accordance with the particular character of the charcoal treated.

The absorption of the sulfur dioxid is preferably effected in the following manner: The gaseous mixture, previously dried, containing the sulfur dioxid, is brought into contact at, say, ordinary room temperature, 11° C.–24° C., with the charcoal or its equivalent, prepared, as hereinbefore described. To this end, it will be found convenient to place the charcoal in a number of receptacles or cells, communicating with each other in series, so that the gaseous mixture containing the sulfur dioxid may be passed through these cells in succession. The sulfur dioxid is found to be completely removed from the gaseous mixture, by passing through the charcoal, even though the rates of passage, and the concentrations of sulfur dioxid in the mixture are varied within wide limits. As hereinbefore indicated, the total amount of sulfur dioxid taken up by the charcoal will vary from say 10% by weight to 30% by weight, according to the charcoal selected, and the efficiency of its treatment. The sulfur dioxid thus taken up by the coke, animal charcoal or vegetable charcoal, as the case may be, can be recovered therefrom in almost its entirety and in a state of great purity. To this end, without removing the charcoal from the cells in which it has been contained during the taking on of the sulfur dioxid, the cells containing the charcoal are heated at ordinary or reduced pressure, in accordance with either of the two following methods: In accordance with one of these methods, the cells containing the charcoal are heated, at ordinary atmospheric pressure, from a room temperature to such a degree as will remove certain substances which have been absorbed at the time of the taking up of the sulfur dioxid. The temperature thus employed is one which rises gradually from room temperature to 130° C. At this temperature, a small portion of the sulfur dioxid is likewise incidentally driven off. The main body portion of the sulfur dioxid, however, is recovered by raising the temperature of the cells from 130° C. to 180° C. and it is found that the sulfur dioxid thus recovered is of a purity which is equal to say from 87%–98% and higher, according to circumstances. It will also be understood that instead of recovering the occluded gases fractionally, as given above, they may be removed in one operation, in which case the sulfur dioxid so recovered will not be quite as pure as that obtained by the method indicated above.

Instead of heating the cells containing the charcoal at ordinary atmospheric pressure, they may be heated under a reduced pressure of say 17 millimeters, and the sulfur dioxid recovered in such case has a percentage of purity within the same range as when heated under atmospheric pressure.

After the sulfur dioxid has been removed by either of the methods specified, the charcoal after cooling in the closed cell is found to be restored to its original weight, without perceptible loss, and is ready for reuse, in the absorption of sulfur dioxid, without further treatment.

Referring again to the temperature at which the sulfur dioxid is absorbed from the gaseous mixture, I would state that I prefer ordinary temperatures, for the reason that, under working conditions, ordinary temperatures are probably the cheapest to use; although it will be understood that where it is of importance to increase the rapidity of the absorption and to increase the amount of sulfur dioxid absorbed, the temperature may be lowered to advantage. In fact, it has been found that as the temperature is lowered, the rate of absorption and the amount of sulfur dioxid absorbed not only increases, but increases more rapidly in proportion to the drop in temperature, down to temperatures of about −20° C. It is therefore obvious, that where local conditions will justify it, the temperature of absorption should be maintained relatively low, to the advantage of the operation.

The invention is of particular commercial importance for the reason that the process is available for removing from the waste gases of smelters and the like, the sulfur dioxid present even when in a condition of great dilution therein.

I do not limit myself to dry gaseous mixtures as indicated above, for while it has been found that dry gases give the best results, still with wet gases the same general result, with a somewhat lesser efficiency, is obtained.

What I claim is:

1. The method of removing sulfur dioxid from gases containing it, which comprises passing the gases through absorbent carbonaceous material from which have been preliminarily expelled such volatile constituents as would tend to deposit in the mass a part of the sulfur dioxide as elemental sulfur; substantially as described.

2. The method of removing sulfur dioxid from gases containing it, which comprises drying the gases and then passing them through absorbent carbonaceous material from which have been preliminarily expelled such volatile constituents as would tend to deposit in the mass a part of the sulfur dioxid as elemental sulfur; substantially as described.

3. The method of removing sulfur dioxid from gases containing it, which comprises passing the gases through absorbent carbonaceous material from which have been preliminarily expelled such volatile constituents as would tend to deposit in the mass a part of the sulfur dioxid as elemental sulfur, and subsequently expelling and recovering the sulfur dioxid taken up; substantially as described.

4. The method of removing sulfur dioxid from gases containing it, which comprises expelling from charcoal by heat the volatile constituents which would tend to deposit therein a part of the sulfur dioxid as elemental sulfur, and passing the gases through the charcoal; substantially as described.

5. The method of removing sulfur dioxid from gases containing it, which comprises expelling from charcoal by heat and at a pressure less than atmospheric the volatile constituents which would tend to deposit therein a part of the sulfur dioxid as elemental sulfur, and passing the gases through the charcoal; substantially as described.

6. The method of removing sulfur dioxid from gases containing it, which comprises expelling from charcoal by heat the volatile constituents which would tend to deposit therein a part of the sulfur dioxid as elemental sulfur, cooling the charcoal out of contact with the air, and passing the gases through the charcoal; substantially as described.

7. The method of removing sulfur dioxid from gases containing it, which comprises expelling by heat from charcoal the volatile constituents which would tend to deposit therein a part of the sulfur dioxid as elemental sulfur, passing the gases through the charcoal, and subsequently recovering the sulfur dioxid therefrom by driving it off by heat; substantially as described.

8. The method of removing sulfur dioxid from gases containing it, which comprises expelling by heat from charcoal the volatile constituents which would tend to deposit therein a part of the sulfur dioxid as elemental sulfur, passing the gases through the charcoal, subsequently heating the charcoal at a relatively low temperature to drive off absorbed impurities of lower volatility than sulfur dioxid, and finally raising the temperature to drive off the sulfur dioxid; substantially as described.

9. The method of removing sulfur dioxid from gases containing it, which comprises passing the gases through charcoal from which has been preliminarily expelled such volatile constituents as would tend to deposit in the mass a part of the sulfur dioxid as elemental sulfur, and subsequently heating the charcoal to a temperature of about 180° C. to drive off the sulfur dioxid; substantially as described.

10. The method of recovering sulfur dioxid from gases containing it, which comprises expelling by heat from charcoal the volatile constituents which would tend to deposit therein a part of the sulfur dioxid as elemental sulfur, passing the gases through the charcoal, subsequently heating the charcoal at temperatures up to about 130° C. to drive off absorbed impurities of lower volatility than sulfur dioxid, and finally raising the temperature to about 180° C. to drive off the sulfur dioxid; substantially as described.

11. The method of removing sulfur dioxid from gases containing it, which comprises passing a current of the gases through an absorbent carbonaceous material and thereby removing the sulfur dioxid there from, and subsequently expelling and recovering the thus absorbed sulfur dioxid; substantially as described.

12. The method of removing sulfur dioxid from gases containing it, which comprises passing a current of the gas through absorbent charcoal and thereby removing the sulfur dioxid therefrom and subsequently heating the charcoal to a sufficient temperature to drive off the thus absorbed sulfur dioxid; substantially as described.

13. The method of removing sulfur dioxid from gases containing it, which comprises passing a current of the gases through an absorption receptacle containing absorbent carbonaceous material, and thereby absorbing the sulfur dioxid from such gases, expelling the thus absorbed sulfur dioxid from such material within the receptacle by heating, and repeating the process to absorb further amounts of the sulfur dioxid; substantially as described.

14. The method of removing sulfur dioxid from gases containing it, which comprises passing a current of the gases through a series of absorption receptacles containing absorbent carbonaceous material and thereby absorbing the sulfur dioxid from such gases, expelling the thus absorbed sulfur dioxid from such material within the receptacles by heating, and repeating the process to absorb further amounts of the sulfur dioxid; substantially as described.

15. The process of recovering sulfur dioxid absorbed by charcoal which comprises heating the charcoal to a temperature of about 180° C., and thereby expelling the sulfur dioxid therefrom; substantially as described.

16. The process of recovering sulfur dioxid absorbed by charcoal, which comprises heating the charcoal at temperatures up to about 130° C. to drive off absorbed impurities of lower volatility than sulfur dioxid, and finally raising the temperature to about 180° C. to drive off the sulfur dioxid; substantially as described.

In testimony whereof I affix my signature, in presence of two witnesses.

JAMES B. GARNER.

Witnesses:
H. H. SMITH,
GEO. B. NICKEL.